United States Patent

Day et al.

[11] 3,909,380
[45] Sept. 30, 1975

[54] REFERENCE PATTERN ZETA POTENTIAL MEASUREMENT APPARATUS AND METHOD THEREFOR

[75] Inventors: James T. Day, Maplewood; Robert J. Crosby, Basking Ridge; Walter R. Wills, Cedar Knolls, all of N.J.

[73] Assignee: Komline-Sanderson Engineering Corporation, Peapack, N.J.

[22] Filed: July 19, 1974

[21] Appl. No.: 489,918

[52] U.S. Cl............................. 204/180 R; 204/299
[51] Int. Cl.².......................................... B01K 5/00
[58] Field of Search.................... 204/1, 180 R, 299

[56] References Cited
UNITED STATES PATENTS

| | | | |
|---|---|---|---|
| 3,208,919 | 9/1965 | Sennett et al. | 204/1 |
| 3,454,487 | 7/1969 | Riddick | 204/299 |
| 3,663,395 | 5/1972 | Strickler | 204/180 R |
| 3,708,402 | 1/1973 | Bean | 204/299 |
| 3,764,512 | 10/1973 | Greenwood et al. | 204/299 |

*Primary Examiner*—John H. Mack
*Assistant Examiner*—A. C. Prescott
*Attorney, Agent, or Firm*—Watson, Cole, Grindle & Watson

[57] ABSTRACT

The zeta potential of a fluid sample is determined by adjusting the horizontal scan rate of a reference pattern superimposed over an image of the fluid particle movement displayed on a monitor. The scan rate is adjusted by a potentiometer and is compensated in accordance with a function related to the temperature of the sample and the voltage gradient of the electrophoresis cell. The sample within the electrophoresis cell is irradiated with cold light through a plane substantially perpendicular to the field of gravity and the irradiated chamber may be magnified in a plane substantially parallel to the field of gravity before being displayed. The electrophoresis cell is a transparent elongated chamber having a section with flat surfaces and transparent windows bonded to the flat surfaces and means bonded to one of the windows to form a confined optical path for viewing a selected area of the section. Each end of the elongated chamber includes passages for the introduction and egress of fluid as well as an electrode for application of a voltage gradient to cause particle movement.

13 Claims, 5 Drawing Figures

REFERENCE PATTERN ZETA POTENTIAL MEASUREMENT APPARATUS AND METHOD THEREFOR

BACKGROUND OF THE INVENTION

The measurement of the zeta potential of fluids and the use of such measurement for agglomeration control are well known. For example, method and apparatus for measuring zeta potential and the use of such measurements for agglomeration control are disclosed in U.S. Pat. No. 3,723,712 assigned to the same Assignee as the present invention.

Zeta potential measurement systems comprising a microscope, a cell and associated power supply for providing the necessary DC voltages to the electrophoresis cell are well known. A zeta potential reading is made by filling the electrophoresis cell either by hand or by an automatic feed apparatus with a sample of the fluid, focusing the microscope on a proper area of the electrophoresis cell and then counting by a stop watch the time of travel of selected particles across a measured distance. In such a measurement system the particles must be individually timed and the average speed computed by hand. The particle mobility and zeta potential can then be obtained from a chart based on the average speed and the electrophoresis cell voltage. In obtaining zeta potential measurements, the temperature of the sample is critical and such temperature corrections are done manually from factors associated with the particle mobility and zeta potential. In such system there is no direct indication of zeta potential and also no automatic temperature compensation. Further, neither the cell, the light source, nor the microscope is permanently fixed in place, therefore making it necessary to readjust all three elements practically every time a fresh sample is measured and analyzed. Such systems also have the disadvantage that the readings tend to vary from one operator to another because of the subjective nature of the measurements as a result of what portion of the cell is observed and which particles are measured.

Recently, zeta potential measuring apparatus has adopted laser technology. In one such system the electrophoresis cell is scanned with a laser beam by means of an oscillating mirror driven by a galvanometer. The moving particles' speed relative to the scanning laser light in the field of the microscope is brought to zero by varying the speed of the mirror. Such a system is capable of reading out the zeta potential digitally. Such a system, like that previously described above, is very difficult and tedious to use because of the necessity of realigning the optical system and focusing on the proper point in the electrophoresis cell to obtain accurate readings. In such systems, misalignment of the optics and the resulting erroneous data is often obtained without knowledge of the operator. One advantage of such a system is that the laser light source enables the detection of the motion of submicron particles.

SUMMARY OF THE INVENTION

In the method and apparatus of the present invention, a television camera or other equivalent image sensor, such as a photosensitive array utilizing a suitable lens system, observes the fluid within an electrophoresis cell, which is illuminated so as to produce an image of the particles suspended inside the cell. In the apparatus of the present invention the electrophoresis cell is illuminated by fiberoptics to provide a cold light source, thereby preventing convection currents in the electrophoresis cell from disturbing the electrophoretic motion of the particles and providing an erroneous measurement thereof.

The suspended particles within the electrophoresis cell are magnified by a microscope and an image thereof is generated by a television camera or vidicon tube and projected onto a monitor screen. A reference pattern is superimposed on the magnified monitor TV image, which pattern comprises a number of vertical lines or spots which are caused to sweep horizontally across the monitor screen or remain motionless independent of the primary TV image. The zeta potential measurements are made by injecting a fresh fluid sample into the electrophoresis cell by means of a sample pump and solenoid valves. When a fresh sample has been introduced into the cell, the solenoid valves close the ends of the cell and the electrophoresis voltage is turned on causing the particles to migrate within the cell. The sweep speed of the reference pattern is then adjusted manually to match the speed of any single particle or group of particles on the monitor screen.

The sweep speed of the manually adjusted reference pattern may be converted electronically to a zeta potential signal which is corrected for the temperature of the sample. The correct zeta potential value for the given sample is then indicated on the instrument. The zeta potential also appears as a four to twenty milliamp output signal for purposes of recording or process control such as is discussed in the aforementioned U.S. Pat. No. 3,723,712.

The primary advantage of the present apparatus resides in the optical system. In many of the aforementioned prior art zeta potential measuring systems the optical path of the system is from the eye of the operator to a microscope to the electrophoresis cell to a mirror and then to a light source. In the present invention the optical path is from the eye to the television picture to a television camera to a lens to the cell to a fiberoptic conductor and then to a light source. A significant advantage of the reference pattern zeta reader measurement is that more than one operator may observe the image of the particles in motion simultaneously. Further, the pattern image may be enlarged without loss of detail by the use of a larger TV picture tube and higher resolution equipment. The television camera, lens and electrophoresis cell are mounted into their proper positions and many readings can be taken without the necessity of making adjustments.

In the aforementioned prior art systems, the microscope views the cell from above and the particles appear to the eye to be moving in straight lines toward one or the other electrode of the electrophoresis cell. Actually, particles are also falling because of gravity. This causes a problem with rapidly sinking particles, i.e., those particles having higher density or greater weight only appear in focus for a short time and then fall past the plane of focus to the bottom of the electrophoresis cell. Such a problem is eliminated in the present apparatus by viewing the particle motion from the side of the cell. In such an arrangement the plane of focus in the cell is parallel to the forces causing motion in both the horizontal and vertical directions and any particle in focus at the beginning of a measurement will remain in focus until it drops out of the field of view. Thus, by observing the electrophoresis cell horizontally, the accuracy of observation of particle movement is greatly enhanced and increased.

A slurry that contains many large particles that settle rapidly will become much more turbid at the bottom of the cell a short time after the sample comes to rest in the cell. Consequently, the light transmission becomes increasingly poor near the bottom of the cell. However, in the present invention the light transmission of the electrophoresis cell actually improves since, as the heavier particles drop out of the picture, the sample being observed becomes clearer. A slurry containing such a high density of particles or aggregates that no individual features remain visible in the field for more than a few seconds can be analyzed for zeta potential by adjusting the reference pattern scan rate to match the motion of the general mass migration across the television monitor.

Another distinct advantage of the present invention is that the electrophoresis cell is illuminated by a small incandescent bulb of less than ten watts and a fiberoptic light pipe which filters out undesirable heat and delivers a concentrated spot of cold light to the back of the cell, thereby eliminating the effects of temperature upon particle motion.

The present system is limited to the measurement and detection of particles approximately five microns or greater in diameter. However, the detection can be improved by the use of a higher resolution TV camera.

In the system described in the aforementioned U.S. Pat. No. 3,723,712, a TV monitor is also used to provide a magnified view of the suspended particles within the electrophoresis cell. The basic difference between that system and the system of the present invention is that the system described in the aforementioned U.S. patent functions with or without the TV monitor as the video camera picture signal is fed directly to a computer for automatic computation and readout of zeta potential. Thus, the TV monitor in the patented system is simply a very helpful but non-essential indicator of the operating status of the opto-electronic system. However, in the reference pattern system of the present invention, the TV monitor is an essential link in the opto-electronic system as the particle migration rate is compared to a variable reference pattern rate by actual use of the TV monitor. In the system of the present invention, the monitor also acts as an indicator of the operating status of the system as in the aforementioned patented system.

A further significant advantage of the present system over that which is described in U.S. Pat. No. 3,723,712 is that the present system is semi-automatic, whereas the system described in the aforementioned patent is totally automatic. Thus, the present invention eliminates much of the complex and expensive automatic hardware required in the aforementioned system.

OBJECT OF THE INVENTION

It is a primary object of the present invention to provide an accurate semi-automatic zeta potential measurement system.

It is another object of the present invention to provide a semi-automatic zeta potential measurement system of the type defined herein which is less complex and less expensive than prior art zeta potential measurement systems.

It is yet another object of the present invention to provide apparatus for the measurement of zeta potential having improved reliability and accuracy for repetitive measurements.

It is still a further object of the present invention to provide improved apparatus of the type defined herein in which a TV monitor is used to observe the electrophoretic mobility of particles within a sample fluid and the zeta potential measurement is obtained by manual adjustment of the speed of a reference pattern across the surface of the TV monitor.

GENERAL DESCRIPTION

Figure 1:
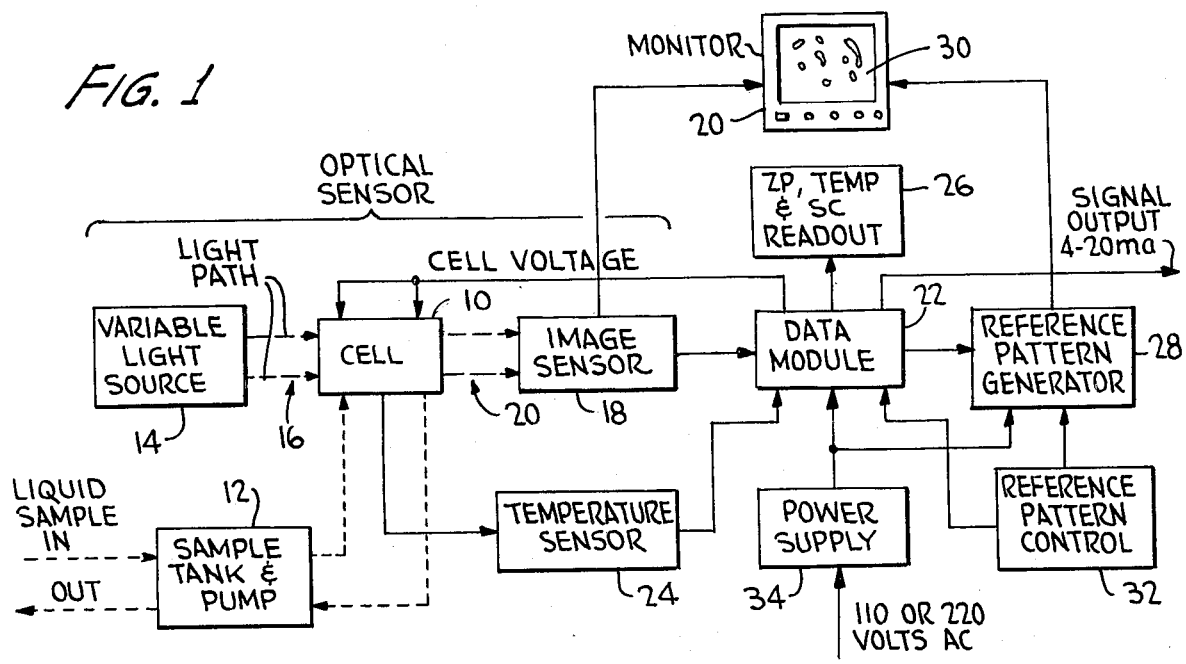
FIG. 1 illustrates in block diagram format the reference pattern zeta potential measurement apparatus.

With reference to FIG. 1, electrophoresis cell 10 contains a liquid sample provided by sample tank and pump 12 and is illuminated by variable intensity light source 14 via a light path 16 which illuminates electrophoresis cell 10 with cool light so as to avoid the adverse effects on the measurement of electrophoretic mobility within electrophoresis cell 10 created by temperature changes. The electrophoretic mobility of the sample within electrophoresis cell 10 is detected by image sensor 18 via optical path 20, which may include a microscope to magnify the image of the particles within electrophoresis cell 10 as will be more fully described hereinafter. The output of image sensor 18 is input to TV monitor 20 which presents an image of the particle motion within electrophoresis cell 10. The output of image sensor 18 is also input to data module 22 wherein the necessary calculations of the zeta potential are made. A disclosure of the relevant and pertinent formulae for computing zeta potential are found in U.S. Pat. No. 3,723,712 and will not be described further herein. The temperature of the sample within electrophoresis cell 10 is sensed by temperature sensor 24 and that information is input to data module 22. The output of data module 22 comprises the zeta potential, temperature and specific conductivity of the sample within electrophoresis cell 10. Any one of the aforementioned outputs can be digitally indicated by readout 26. Temperature compensation data from data module 22 are output to reference pattern generator 28, which provides an input to TV monitor 20, and in particular a signal for controlling the horizontal sweep rate of the reference pattern 30 across the particle image on monitor 20. Reference pattern control 32 provides an input to data module 22 and to reference pattern generator 28 for the generation of the aforementioned reference pattern sweep rate. Power supply 34 provides the necessary power to the system modules. Data module 22 also provides a four to twenty milliamp signal output, which can be used to adjust automatic control apparatus as described in the aforementioned U.S. patent. A variable cell voltage is provided to reference pattern generator 28 and to electrophoresis cell 10 from data module 22 to provide the necessary electric field to initiate and maintain particle movement.

DETAILED DESCRIPTION

Variable Light Source

Variable intensity light source 14 provides the necessary illumination of electrophoresis cell 10 whereby the image of particles in the sample may be detected by image sensor 18 and observed by the operator on television monitor 20. It is a significant advantage of the apparatus of the present invention that only light and little or no heat energy are transmitted to the electrophoresis cell 10 inasmuch as the electrophoretic mobility of the particles is affected by changes in temperature. Heat transfer of any kind into the electrophoresis cell will generate convection currents in the sample which interfere with the electrophoretic migration of the particles therein. The radiation and conduction heating of electrophoresis cell 10 is reduced or eliminated by using a glass fiberoptic light pipe which carries light to the proper point in the electrophoresis cell 10 and at the same time filters out lower frequency energy emitted by the light source. The light intensity is controlled by varying the voltage to light source 14 such as a light bulb.

ZETA READER ELECTROPHORESIS CELL

Figure 2:
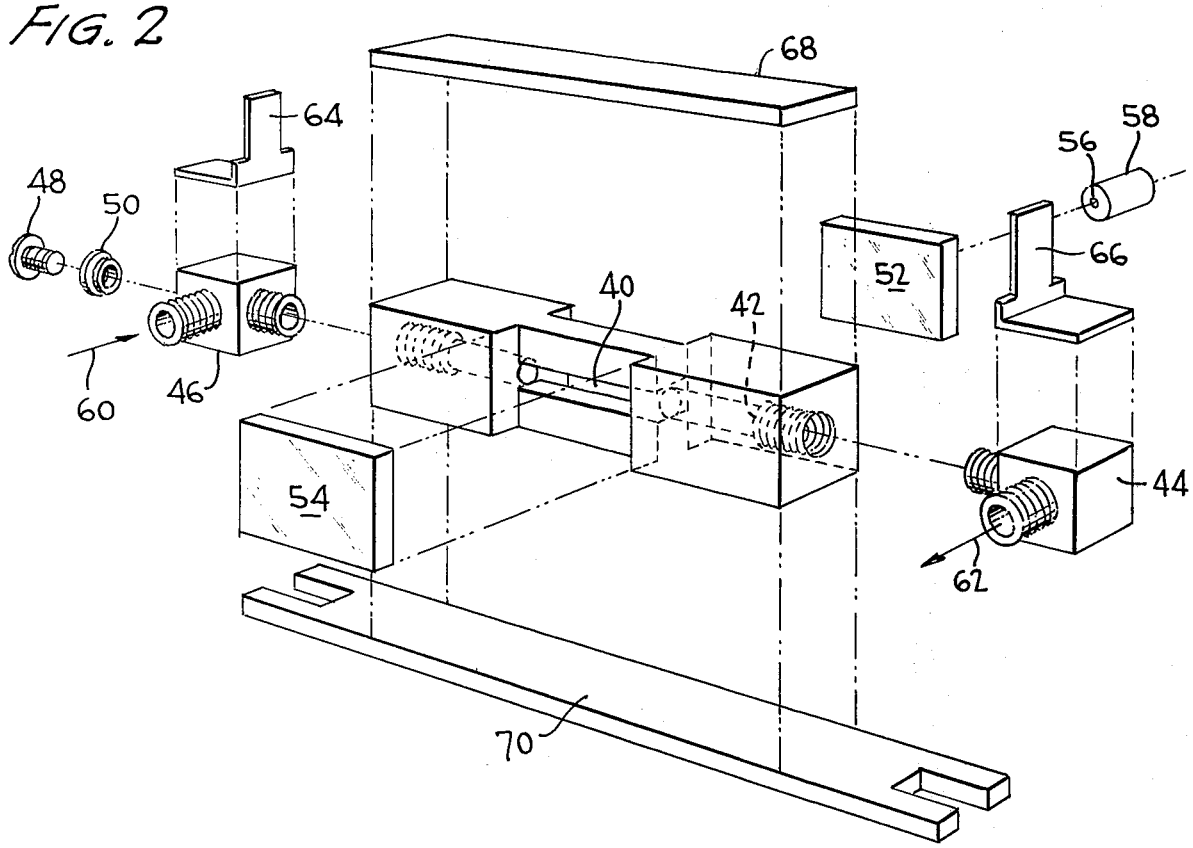
FIG. 2 is an exploded view of an exemplary embodiment of an electrophoresis cell used in measuring the zeta potential in the present system.

With reference to FIG. 2, electrophoresis cell 10 basically comprises a two and one-half inch length of one-half by one-half inch clear polyacrylic rod 40. A centrally located hole 42 is drilled the length of rod 40 and tubing fittings 44, 46 are attached to each end of the rod. Tubing fittings 44, 46 serve two purposes, namely, they connect electrophoresis cell 10 to a sample pump (not shown) by means of tubing so that fresh liquid samples may be automatically flushed through the cell and they also serve as cell electrodes. Cleanout screw 48 and washer 50 at one end of electrophoresis cell 10 enable the cell to be internally cleaned without the necessity of removing fittings 44, 46 or tube 40.

Image sensor 18 observes electrophoresis cell 10 at about approximately the middle of rod 40 where a section of that rod is milled away and replaced by small glass windows 52, 54, one on each side of the glass rod as illustrated in FIG. 2. The glass improves the quality of the particle images detected by image sensor 18. Image sensor 18 observes the sample through glass window 54. Behind glass window 52 a pinhole 56 is provided in fiberoptic coupler 58 through which the fiberoptic illumination enters the measurement portion of the cell.

Electrophoresis cell 10 is the most critical component of the optical system of the measurement apparatus in that it receives and holds the fluid-solid mixture between cell electrodes 44, 46 so as to be viewed by image sensor 18. The fresh sample is sucked into the cell by means of pump and solenoid valves 104, 106, on FIG. 3, which are then closed to seal the sample inside the cell. The sample is fed into the cell through port 60 and exits via port 62. Once the solenoid valves are closed, a DC voltage between ten to five hundred volts is placed between cell electrodes 44, 46 via respective quick-connect terminals 64, 66. The DC voltage causes each suspended particle of sample within the electrophoresis cell 10 to move because of its own charge toward an electrode having an opposite polarity. The velocity of each particle is proportional to its own surface charge, the cell voltage, and the temperature of the sample. Motion of the particle is viewed by image sensor 18 and its motion is resolved into a zeta potential. If a particle within the sample does not move, it has a surface charge of zero and is assumed to have a zero zeta potential.

The components forming the actual cell itself are retained within bakelite brace 68 and a bakelite mounting base 70 as illustrated in FIG. 2.

Image Sensor

The image sensor used in the reference pattern zeta potential measurement system preferably comprises a standard television vidicon tube, which is designed for above average quality picture reproduction. The image is focused on the face of the vidicon tube with a standard ten power microscope objective lens. The purpose of the image sensor is simply to obtain a reasonably good representation of the individual particles and convey that information to a television monitor for observation by the operator of the system. resolution. As indicated previously, the resolution of the present system is approximately five microns; however, that resolution may be increased by the use of a high resolution vidicon tube, which is available with state-of-the-act technology.

TV Monitor

TV monitor 20 may comprise any black and white or color television monitor which accepts a closed circuit TV system signal. The monitor displays a primary image generated by the aforedescribed TV camera for the observation of the fluid sample within an electrophoresis cell 10. Superimposed on top of the primary image is reference pattern 30 which may preferably consist of a number of vertical lines evenly spaced across the TV screen. The vertical lines are produced by a reference pattern generator which will be more fully described hereinafter. The vertical lines are caused to sweep across the TV camera image at manually adjustable speeds which are controlled by a knob on data module 22.

Data Module

Data module 22 includes the switching for generating the variable cell voltages for electrophoresis cell 10, a timer for controlling automatic sampling from sample tank and pump 12, an analog-to-digital converter for readout of temperature, specific conductance, and zeta potential, and another converter to develop a four to twenty milliamp signal output which is used for control purposes as previously described. Preferably, data module 22 is housed in a cabinet which also contains TV monitor 20, a process indicator-controller, and a chart recorder or other read-out device.

Reference Pattern Generator and Reference Pattern Control

As mentioned previously, the reference pattern consisting of vertical lines 30 on monitor 20 is superimposed over the TV camera image of the particles observed in electrophoresis cell 10. Vertical lines 30 move at a speed controlled by manual potentiometer control 70 which is designated "pattern scan rate" in FIG. 4. It is known that the electrophoretic mobility of the particles is a function of the voltage gradient along the electrophoresis cell as well as the temperature of the fluid sample within the cell. Consequently, the speed of vertical lines 30 must also be controlled in accordance with the voltage gradient along electrophoresis cell 10 and the temperature of the fluid sample within it. Pattern scan rate control 70 adjusts the output of voltage divider 72 which is input to cell voltage scaling circuit 74. The output of cell voltage scaling circuit 74 is input to voltage control ramp generator 75 and consists of a combination of the output of voltage divider 72 and a voltage proportional to the cell voltage adjusted by the cell voltage knob and applied to the electrophoresis cell. Temperature compensation circuit 76 develops control signals for voltage controlled ramp generator 75 so as to provide temperature compensation of the reference pattern for the electrophoresis cell which is proportional to the difference between the temperature of the sample within the cell and a reference temperature. Thus, the slope of the ramp output of ramp generator 75 is varied in accordance with the cell voltage, the temperature of the sample within cell 10 and the manually adjusted voltage of voltage divider 72.

The output of ramp generator 72 is input to a voltage variable sync delay circuit 78 which receives synchronization pulses from TV camera 80. The output of sync delay circuit 78 comprises a series of pulses delayed in time from the camera pulses, the delay being only a fraction of the time interval between the camera sync pulses. In the embodiment disclosed herein, the synchronization delay time varies between fixed limits of zero to one-fifth to one-thirtieth of one full horizontal scan line at a frequency determined by ramp generator 72. When the delay output of sync delay 78 reaches its maximum value it is reset back to zero and recycles. Line generator 82 comprises a variable frequency oscillator which is synchronized by pulses from sync delay circuit 78 to generate a number of evenly spaced pulses between each sync pulse. These pulses generate the reference pattern on TV monitor 20 which moves at a speed proportional to the ramp generator 75 output, which in turn is proportional to the voltage from voltage divider 72, cell voltage gradient, and sample temperature.

The temperature within electrophoresis cell 10 is sensed by temperature sensor 84 and input to temperature compensation circuit 76 which develops the aforementioned signal proportional to the temperature within the cell and a reference temperature. The output of temperature sensor 84 is also provided to switch 86. Switch 87 receives the output from specific conductivity sensor 88 which senses the specific conductivity of the fluid sample within electrophoresis cell 10. The movable contacts of switches 86 and 87 are input to voltage controlled oscillator 90. The other input to voltage controlled oscillator 90 is the output of voltage divider 72. When switches 86 and 87 are open, voltage controlled oscillator 90 produces an output frequency proportional to the output of voltage divider 72 and therefore proportional to the manually adjusted reference pattern scan rate. In view of the fact that the output of voltage controlled ramp generator 75 has been adjusted to be proportional to the particle speed and compensated for the temperature of the fluid sample within the electrophoresis cell and the voltage gradient along the cell, the output of voltage controlled oscillator 90 will be a frequency that is directly proportional to the particle movement within the electrophoresis cell. Digital readout circuit 92 is calibrated to provide a direct digital readout of the zeta potential of the fluid sample as it determines the difference between the output of voltage controlled oscillator 90 and the outlet of fixed reference oscillator 94. The output of digital readout circuit 92 represents zeta potential in view of the fact that the output of voltage divider 72 is proportional to the manually adjusted pattern scan rate which has been compensated by cell voltage scaling circuit 74 and temperature compensation circuit 76. It is known that the velocity of particles in an electric field is dependent upon three variables, namely, the voltage gradient of the electrophoresis cell, the temperature of the fluid sample within the cell, and the zeta potential of the particles within the cell. Thus, all three variables have been properly accounted for so that the reference pattern generator illustrated in FIG. 4 will provide a direct readout of zeta potential with switches 86 and 87 in their open position. Voltage controlled oscillator 90 will provide a direct indication of the temperature or the specific conductivity of the fluid within the electrophoresis cell when switch 86 or 87, respectively, is connected to the temperature switch and specific conductivity switch contacts illustrated in FIG. 4.

Figure 4:
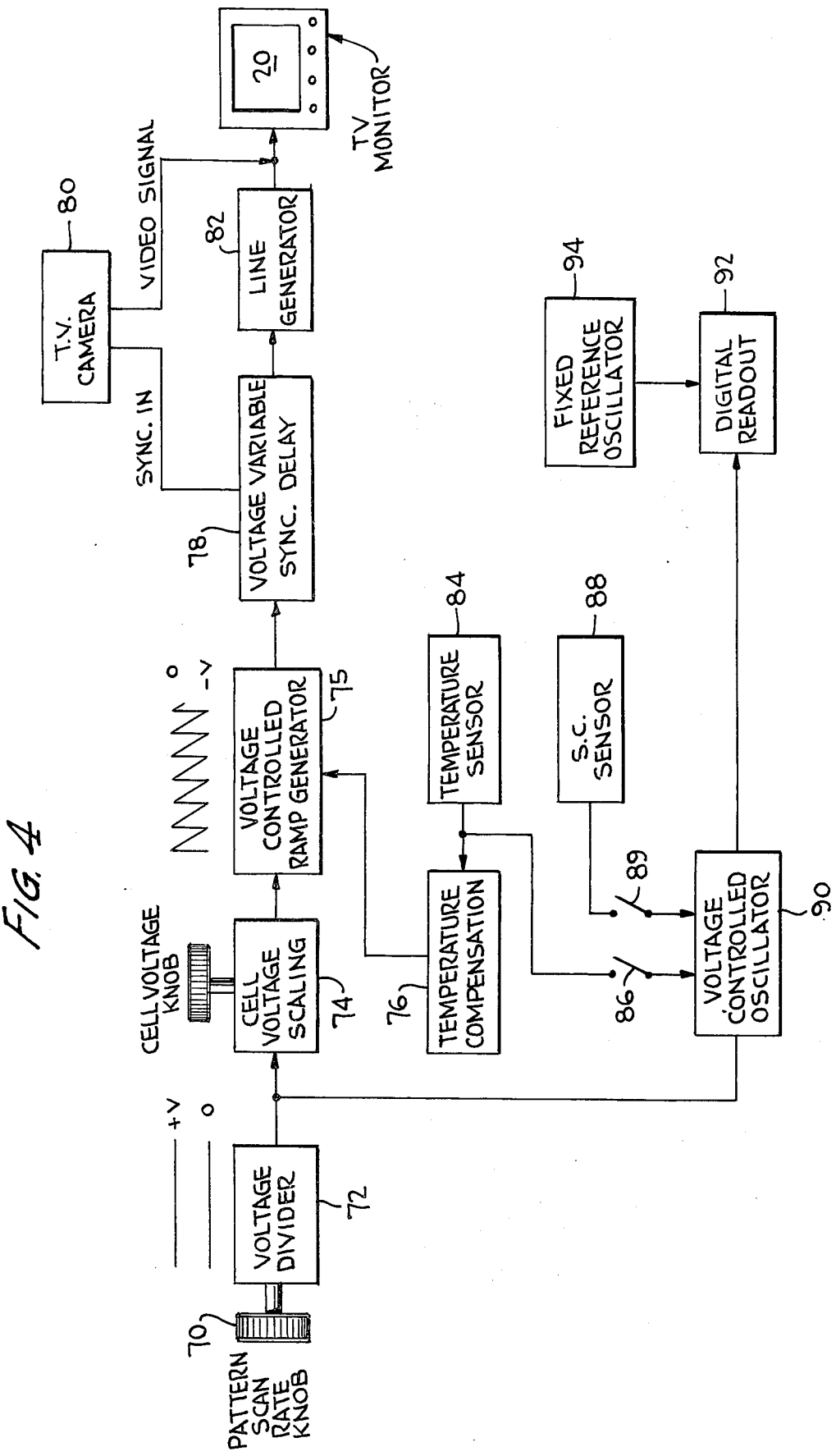
FIG. 4 is a block diagram representation of an embodiment of a reference pattern generator and associated circuitry used with the apparatus of the present invention.

The circuitry comprising the components of FIG. 4 is well known to those skilled in the art so that a detailed description of each of the components is not considered necessary for the purposes of understanding and practicing the invention. Voltage control ramp generator 75 may consist of an integrator circuit including an operational amplifier in which the charging rate of the capacitor in the feedback of the operational amplifier is varied in accordance with voltage. Voltage variable sync delay 78 may also consist of an operational amplifier having an integrator feedback such that the circuit resets at a given level. Temperature compensation circuit 76 may consist of an amplifier having an output which is proportional to the change in mobility of particles with temperature. Voltage controlled oscillator 90, digital readout 92 and fixed reference oscillator 94 comprise a well-known digital voltage meter in which the output of voltage controlled oscillator 90 controls the interval during which the output of fixed reference oscillator 94 is counted.

Fluid Sampling

Figure 3:
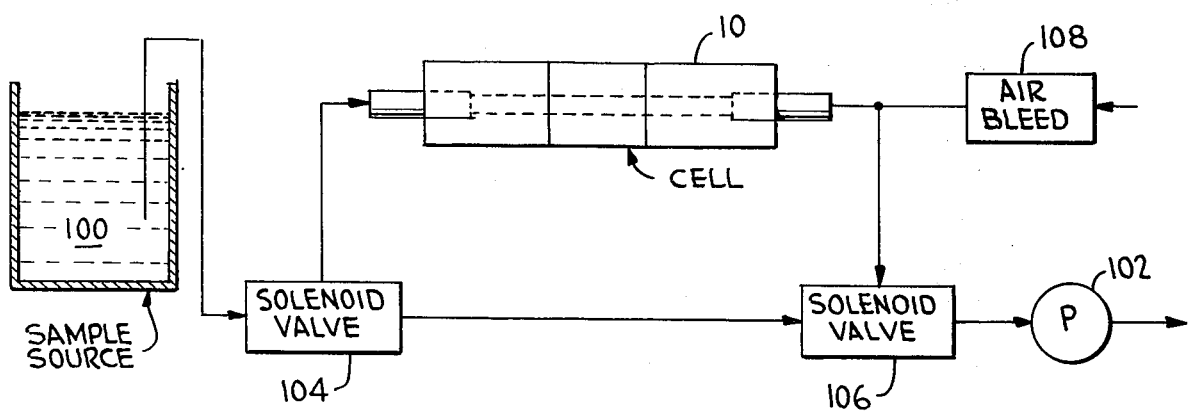
FIG. 3 illustrates an exemplary manner of sampling fluid for injection into an electrophoresis cell.

For the reference pattern zeta measurement apparatus to function properly, electrophoresis cell 10 must be furnished with a continuous source of fresh samples which can be injected into the cell quickly and easily. Also, when the fresh sample is inside electrophoresis cell 10, it must be isolated from outside disturbances which could cause errors in the zeta potential reading. In order to satisfy the aforementioned requirements, the sampling system illustrated in FIG. 3 is utilized. A sample from sample source 100 is pumped under suction by pump 102 through solenoid valves 104, 106, each of which are three-way valves whose third connections are attached by means of tubing to the ends of electrophoresis cell 10. When a fresh sample is desired, the sample ceases flowing from valves 104, 106 and instead flows from solenoid valve 104 to cell 10 and out via valve 106. During a zeta potential measurement, valves 104, 106 close and the sample flow resumes directly from valve 104 through valve 106. Pressure fluctuations are relieved and damped by means of air bleed 108.

Control and Indicator Functions

Figure 5:
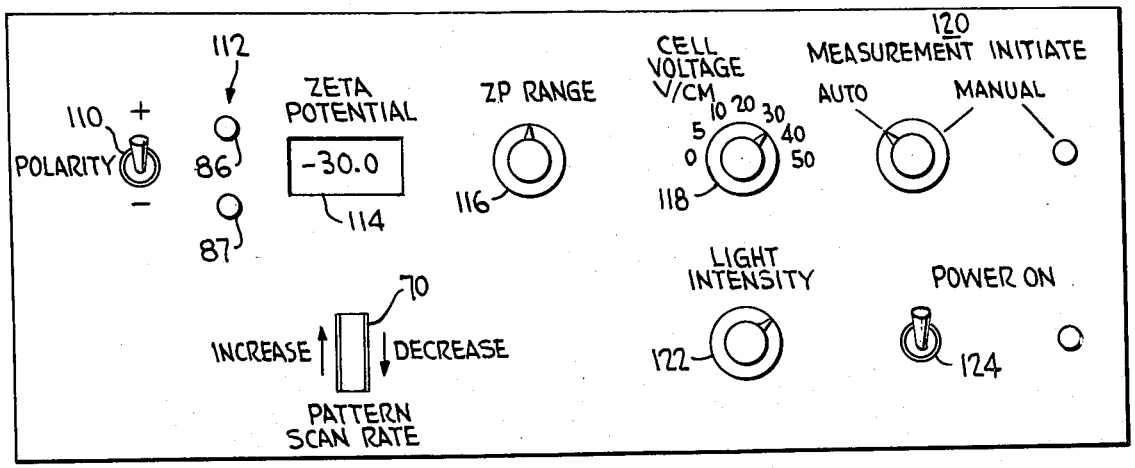
FIG. 5 is a front view of the control and indicator panel of the apparatus of the present invention.

FIG. 5 illustrates an exemplary control panel wherein the polarity of the voltage across electrophoresis cell 10 may be reversed by means of polarity switch 110. Switches 86 and 87, respectively, change the digital indicator 114 to the sample temperature or specific conductivity modes from the normal zeta potential mode. Control 116 enables manual adjustment of the zeta potential range of the instrument so that the sensitivity of the reading may be enhanced. Control 118 enables the cell voltage to be adjusted from a range of zero to fifty volts per centimeter. Measurement initiate control 120 enables either automatic or manual sampling of the fluid into and out of electrophoresis cell 10. The pattern scan rate is adjusted by potentiometer 70, which was previously described with reference to FIG. 4. Finally, the light intensity is variable by means of potentiometer 122 and the power is controlled by power on/off switch 124.

What is claimed is:

1. A method for determining the zeta potential of suspended particles in a fluid comprising the steps of:
   a. introducing a sample of said suspended particles into an electrophoresis cell,
   b. establishing a predetermined voltage gradient along said electrophoresis cell,
   c. displaying the resultant particle movement on a monitor having a variable rate reference pattern,
   d. compensating the rate of said reference pattern in accordance with a function related to that temperature of said sample and the voltage gradient along said cell,
   e. adjusting said variable rate reference pattern to equal said particle velocity, and
   f. determining the zeta potential from the adjusted rate of said reference pattern.

2. A method as in claim 1 further comprising the step of irradiating said sample with a cold light source before said step of displaying.

3. A method as in claim 2 further comprising the step of magnifying a portion of the particle movement prior to said step of displaying.

4. A method as in claim 3 wherein said cold light source irradiates said sample through a plane substantially perpendicular to the field of gravity and the magnified portion of the particle movement is taken within a plane substantially parallel to the field of gravity.

5. A method as in claim 1 wherein said function related to the temperature of said sample is the difference in the temperature of said fluid sample and a reference temperature.

6. A method as in claim 1 further comprising the step of displaying the measured zeta potential.

7. A method as in claim 5 further comprising the step of sensing the specific conductivity of said fluid sample and the step of displaying the measured zeta potential also includes the display of the temperature and specific conductivity of said fluid sample.

8. Apparatus for determining the zeta potential of suspended particles in a fluid from a fluid sample of said suspended particles, comprising:
   an electrophoresis cell;
   means for introducing said fluid sample into said cell;
   means for establishing a predetermined voltage gardient along said electrophoresis cell;
   means for displaying an image of a selected portion of the fluid sample within said cell;
   means for superimposing a variable rate reference pattern on said displayed image;
   means for adjusting the rate of said reference pattern to match the velocity thereof with the velocity of said particles;
   means for compensating said adjusted reference pattern rate in accordance with a function related to the temperature of said sample and the voltage gradient along said cell;
   means for generating an output signal representative of the adjusted and compensated rate of said reference pattern; and
   means for determining the zeta potential of said particles from said output signal.

9. Apparatus as in claim 7 further comprising means for irradiating said sample with a cold light through a plane substantially perpendicular to the field of gravity and means for magnifying said sample in a plane substantially parallel to the field of gravity to provide a magnified image of a selected portion of the fluid sample.

10. Apparatus as in claim 7 wherein said means for compensating includes means for sensing the temperature of said sample and for generating a signal related to the difference between the temperature of said sample and a reference temperature, said means for compensating is responsive to said signal and to said means for establishing a predetermined voltage gradient.

11. Apparatus as in claim 7 further comprising means for displaying the zeta potential of said sample includes switching means for displaying the temperature of said sample or the specific conductivity of said sample.

12. Apparatus as in claim 7 wherein said means for adjusting includes a manually adjustable potentiometer.

13. Apparatus as in claim 7 wherein said electrophoresis cell includes a transparent elongated chamber including a section thereof covered by transparent windows, means forming a confined optical path for illuminating and viewing a selected area of said section, and means at each end of said elongated chamber for the passage of fluid and an electrode for application of said voltage gradient.

It is apparent to those skilled in the art that any other image sensor that could perform the equivalent function of a television camera would operate with the present system. An example of an alternate image sensor would be a photo array comprising a large number of photoelectric cells which are arranged in a closely knit pattern whereby an image can be focused on them with sufficient

* * * * *